(12) United States Patent
Takagi et al.

(10) Patent No.: US 7,706,969 B2
(45) Date of Patent: Apr. 27, 2010

(54) SYSTEM AND METHOD FOR GUIDING A VEHICLE

(75) Inventors: Toru Takagi, Yokohama (JP); Susumu Fujita, Yokohama (JP); Masao Yamane, Yokosuka (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 1160 days.

(21) Appl. No.: 11/315,816

(22) Filed: Dec. 22, 2005

(65) Prior Publication Data

US 2006/0167620 A1 Jul. 27, 2006

(30) Foreign Application Priority Data

Dec. 28, 2004 (JP) .............................. 2004-379769

(51) Int. Cl.
*G01C 21/36* (2006.01)

(52) U.S. Cl. ...................... 701/200; 701/96; 701/300

(58) Field of Classification Search ......... 701/201–213, 701/300, 301, 96; 342/357.1, 357.08, 357.09, 342/357.01, 357.06
See application file for complete search history.

(56) References Cited

U.S. PATENT DOCUMENTS 5,948,040 A * 9/1999 DeLorme et al. ............ 701/201
6,199,010 B1 * 3/2001 Richton ...................... 701/206

FOREIGN PATENT DOCUMENTS

| JP | 08-202995 | 8/1996 |
| JP | 10-103980 | 4/1998 |
| JP | 2000-293791 A | 10/2000 |
| JP | 2000-293799 A | 10/2000 |
| JP | 2001-317953 | 11/2001 |
| JP | 2003-016584 A | 1/2003 |
| JP | 2004-139510 A | 5/2004 |

* cited by examiner

*Primary Examiner*—Richard M. Camby
(74) *Attorney, Agent, or Firm*—Young Basile

(57) ABSTRACT

A guide system terminal device is provided to facilitate group operation vehicles. The guide system terminal device has a transceiver that receives the traveling environment information from another vehicle, such as for the turn signal, vehicle speed, running position, a road change judgment module that judges course changes by the other vehicle based on the traveling environment information of the other vehicle, and a user interface that outputs the judgment result obtained by road change judgment module. For example, the road change judgment module judges a left/right turn to have occurred when the blinker information acquired by turn signal sensor lasts longer than a prescribed time, and when the maximum value of the change in vehicle speed exceeds a prescribed level.

21 Claims, 9 Drawing Sheets

SYSTEM AND METHOD FOR GUIDING A VEHICLE

BACKGROUND

The present invention pertains to a system and method for guiding a vehicle, and in particular to devices that acquire the running information of at least one other vehicle in a group or convoy of vehicles.

Japanese Kokai Patent Application No. 2001-317953 proposed a type of device that supports running of a group of vehicles. There, the group's destination is input to the navigation system of the leading vehicle, and the recommended route computed to reach the destination is transmitted to the following vehicles.

In the approach proposed by said Japanese Kokai Patent Application No. 2001-317953, the leading vehicle computes the recommended route. Consequently, this technology cannot be adopted if the leading vehicle does not have the function of computing the recommended route.

SUMMARY

In accordance with one aspect of the invention, a guidance system is provided for use in a group of vehicles that includes at least a first vehicle and a second vehicle. The guidance system includes a first controller associated with the first vehicle and adapted to generate travel environment information of the first vehicle; a user interface associated with the second vehicle; and a second controller in radio communication with the first controller. The second controller is programmed to determine course change information of the first vehicle based on the travel environment information and to display the course change information on the user interface.

In accordance with another aspect of the invention, a method is provided for exchanging guidance information between a first and second vehicle. The method includes: generating travel environment information of the first vehicle; wirelessly transmitting the travel environment information from the first vehicle to the second vehicle; determining course change information for the first vehicle based on the travel environment information; and displaying the course change information on a user interface located in the second vehicle.

BRIEF DESCRIPTION OF THE DRAWINGS

The description herein makes reference to the accompanying drawings wherein like reference numerals refer to like modules throughout the several views, and wherein.

DETAILED DESCRIPTION

In the embodiments disclosed below, a system for guiding one or more vehicles among a group or convoy of vehicles is provided. The group of vehicles includes a lead vehicle, for example, equipped with a guide system terminal device which transmits travel environment information, and one or more following vehicles equipped with a guide system terminal device that receives the travel environment information. The lead vehicle may, but does not need to, compute a recommended route. The receiving station vehicle that receives the travel environment information judges changes in the direction of the lead vehicle, and displays that result to the driver. Consequently, the following vehicle does not need to display route data on a map. Construction of the guide system terminal device of the vehicles may be thus simplified. Vehicles equipped with the guide system terminal may be able to send and receive travel environment information. Consequently, if the receiving station vehicle is a following vehicle, it can follow the transmission station vehicle serving as the leading vehicle. If the receiving station vehicle is the leading vehicle, it can easily find out whether the transmission station vehicle serving as the following vehicle can follow it.

First Embodiment

Figure 1:
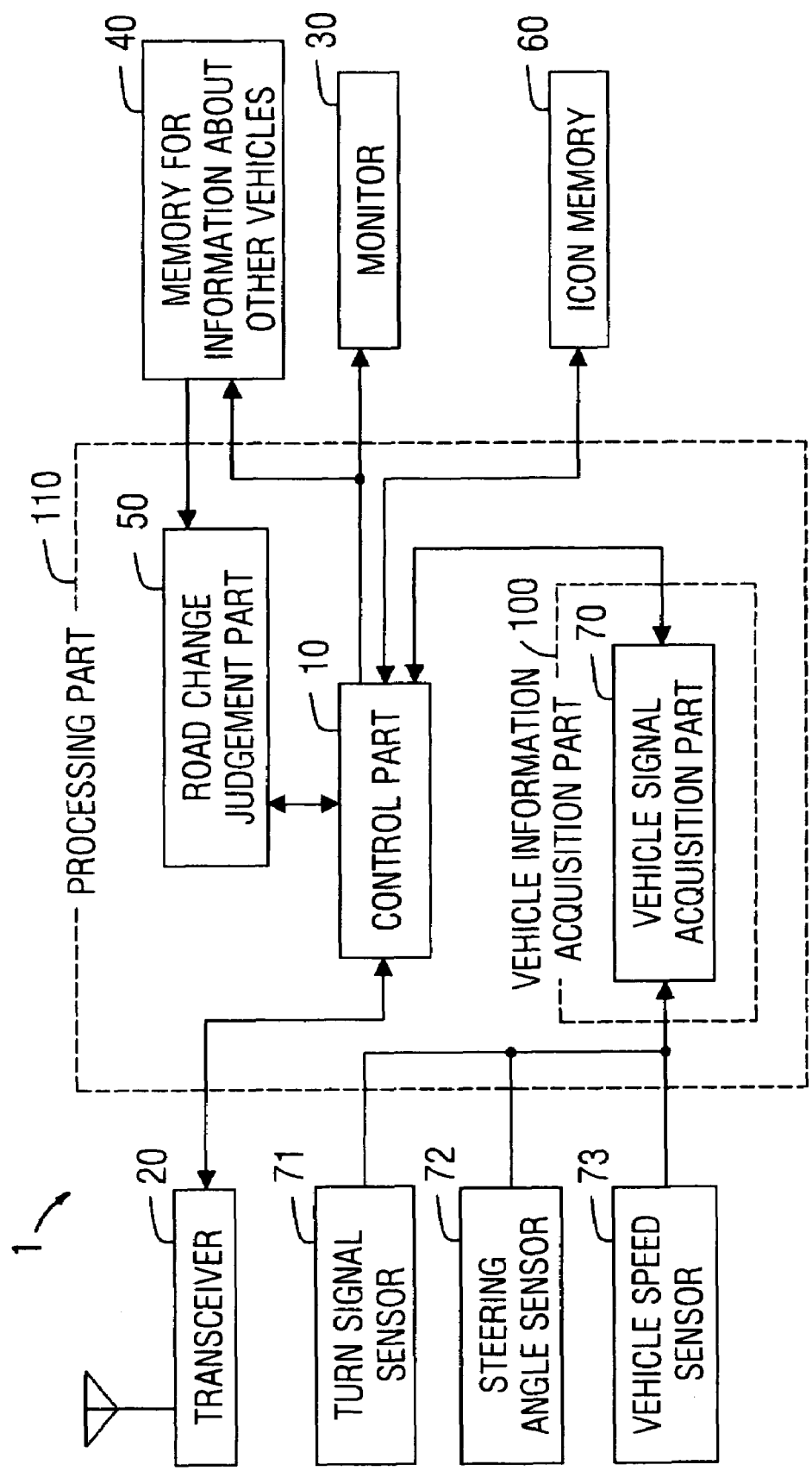
FIG. 1 is a guide system in accordance with a first embodiment of the invention.

FIG. 1 is a block diagram illustrating a guide system terminal device 1 in accordance with a first embodiment of the present invention. The guide system terminal device 1 has a turn signal sensor 71, a steering angle sensor 72, a vehicle speed sensor 73, and a transceiver 20 connected to a processing module 110. A velocity information memory 40, an icon memory 60, and a user interface 30 are also connected to processing module 110. The processing module 110 has a road change judgment module 50 in addition to a control module 10 and a vehicle information acquisition module 100.

The guide system terminal device 1 is installed in at least one vehicle that transmits travel environment information and installed in at lease one vehicle that receives travel environment information. To save cost, the vehicle transmitting the traveling environment information may operate without memory 40 for information about other vehicles, icon memory 60, user interface 30, processing module 10 and road change judgment module 50. The vehicle that receives the traveling environment information may operate without turn signal sensor 71, steering angle sensor 72, vehicle speed sensor 73, service provider 20, control module 10 and vehicle information acquisition module 100. However, if both vehicles are equipped with guide system terminal devices having all of the components shown in FIG. 1, then both vehicles will be able to send and receive traveling environment information and thereby judge changes in the course of the other.

The traveling environment information refers to the information indicating the vehicle operation state and travel environment information obtained from turn signal sensor 71, steering angle sensor 72, and vehicle speed sensor 73. As explained below, vehicle course changes are judged based on the information. For example, it is possible to judge whether the vehicle makes a left/right turn or changes lanes based on the travel environment information.

Acquisition and Transmission of Traveling Environment Information

Control module 10 comprises a microprocessor and its peripheral circuits. It performs processing of information transceived by transceiver 20, processing of information output via user interface 30, and other types of control. It performs overall control of the group operation support device. Control module 10 may also be implemented with multiple processors if desired.

The vehicle information acquisition module 100 serves to acquire traveling environment information for the vehicle. In this first embodiment, this module has vehicle signal acquisition module 70.

Turn signal sensor 71 acquires blinker information at a prescribed timing, and sends it to vehicle signal acquisition module 70. The blinker information includes information with which the driver of the vehicle manipulates the turn signal to cause the blinker to operate, the information to cut off the blinker, and information indicating whether the left or right blinker is operating.

Steering angle sensor 72 acquires the steering angle information at a prescribed timing corresponding to manipulation of the steering wheel by the driver, and sends the information to vehicle signal acquisition module 70.

Vehicle speed sensor 73 acquires the vehicle speed information at a prescribed timing, and sends the information to vehicle signal acquisition module 70.

Vehicle signal acquisition module 70 acquires the vehicle signals from turn signal sensor 71, steering angle sensor 72, and vehicle speed sensor 73 as the traveling environment information for the vehicle, and it sends the information to control module 10.

Transceiver 20 sends and receives traveling environment information for the vehicle and/or receives the traveling environment information for another vehicle serving as it is controlled by control module 10. There is no special limitation on the transceiving method, and suitable methods include a wireless LAN or other narrow-band wireless communication, which may reduce costs, as well as cell phone, PHS, or other broadband wireless communication.

Course Judgment and Output Change

Memory 40 for information about other vehicles stores the traveling environment information for another vehicle received by transceiver 20 under control of control module 10. The traveling environment information by the other vehicles may be successively deleted after a prescribed time has elapsed since reception, or they may be successively deleted after the succeeding vehicle passes a site that the preceding vehicle has passed.

Road change judgment module 50 judges the course change of another vehicle based on the traveling environment information of the other vehicle stored in the memory 40 for information about other vehicles. Here, for example, the judgment of a course change refers to judgment of a left/right turn or change of lane.

Icon memory 60 is a memory for pre-storage of icons for icon display of the judgment result produced by road change judgment module 50, and it allows reading based on control module 10. For example, it may contain the icons for other vehicles and the turn signal icon for displaying the traveling environment information for the other vehicles, the icon for the vehicle and the course change display icon for displaying the result of course change judgments.

User interface 30 is a device for output of the judgment result obtained from road change judgment module 50 by means of a display under control of control module 10. User interface 30 in this embodiment is a monitor. User interface 30 may include a lamp, which is turned ON to illuminate an icon, and may include a speaker for producing audio output.

Operation of the First Embodiment

Figure 2:
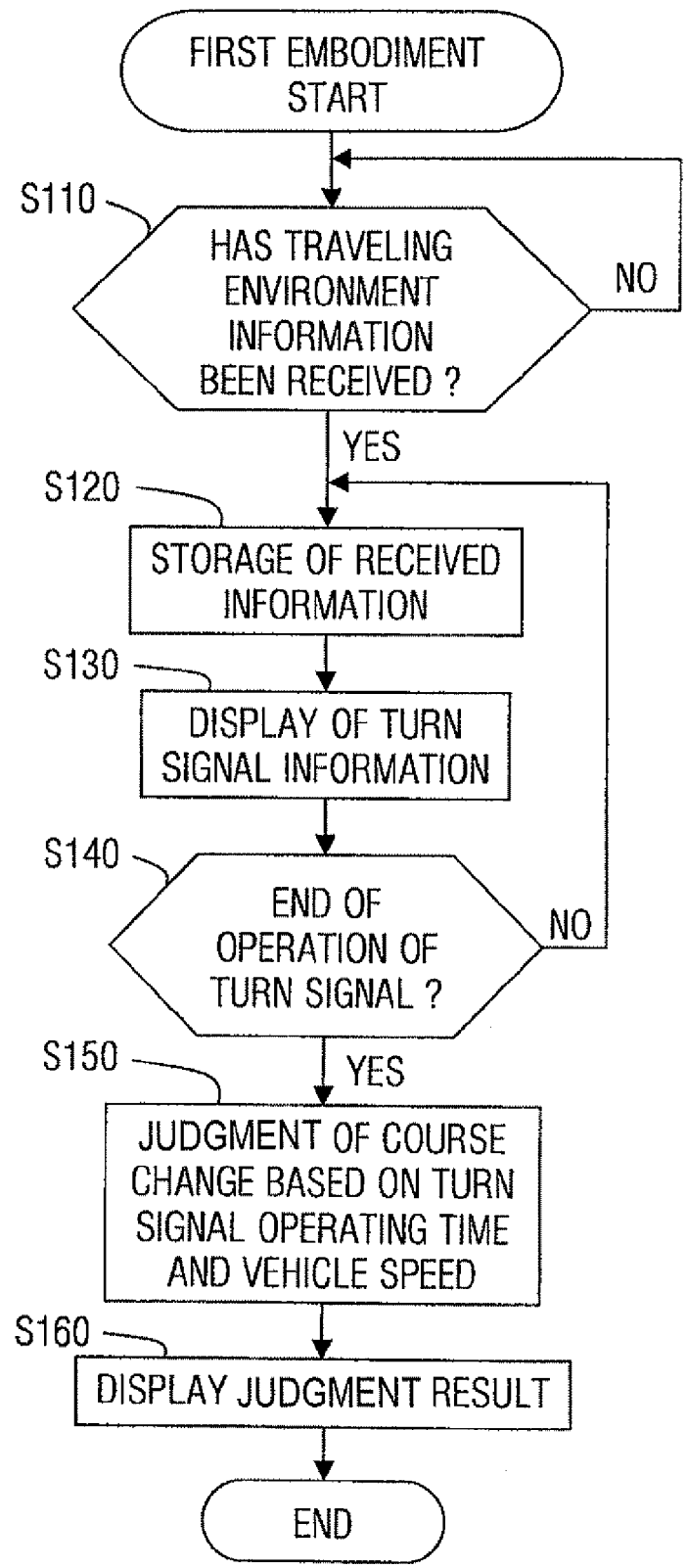
FIG. 2 is a flow chart illustrating the operation of the first embodiment.
Figure 3A:
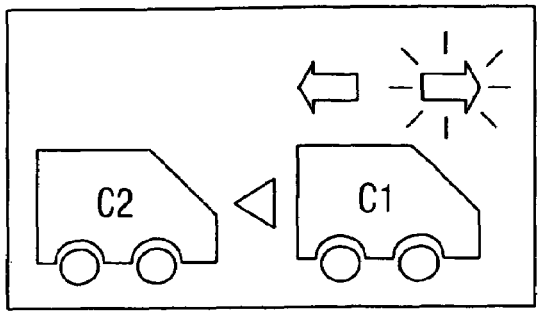
FIGS. 3A and 3B are diagrams of the display output of a monitor of the first embodiment when a right turn is judged to have occurred.
Figure 3B:
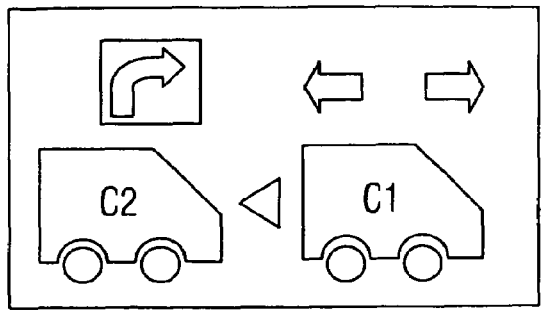
Figure 4A:
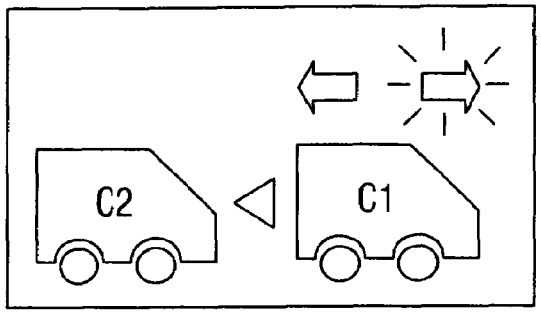
FIGS. 4A and 4B are diagrams of the display output of a monitor of the first embodiment when a right lane change is judged to have occurred.
Figure 4B:
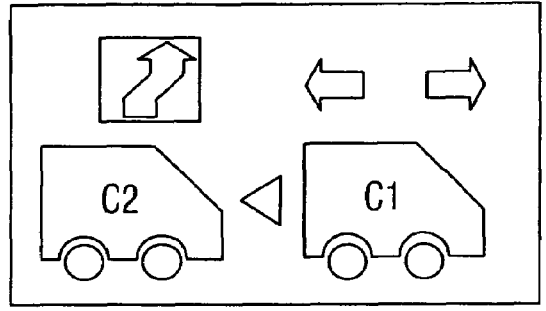
Figure 5A:
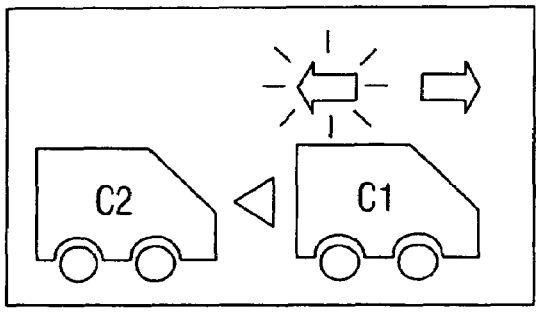
FIGS. 5A and 5B are diagrams of the display output of a monitor of the first embodiment when a left turn is judged to have occurred.
Figure 5B:
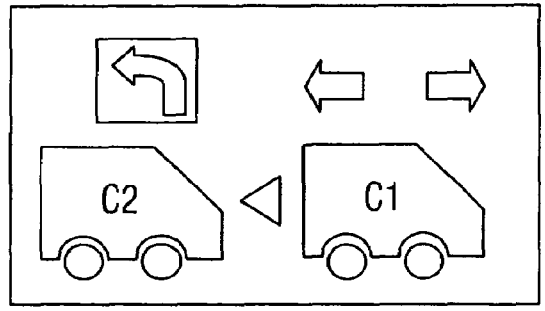
Figure 6A:
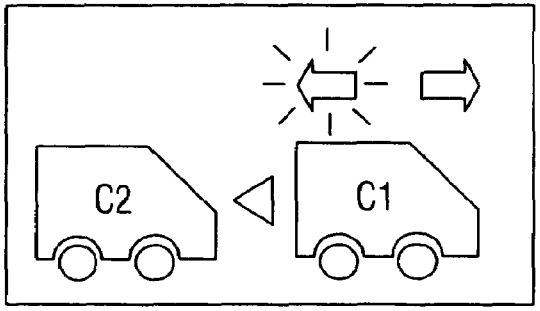
FIGS. 6A and 6B are diagrams of the display output of a monitor of the first embodiment when a left lane change is judged to have occurred.
Figure 6B:
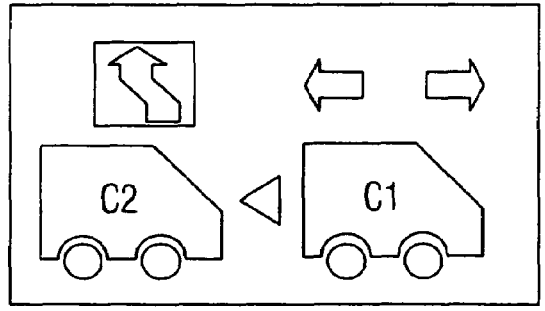

FIG. 2 is a flow chart illustrating the operation of the first embodiment. In the following, an explanation will be given regarding the processing in which the traveling environment information obtained and transmitted from a transmitting vehicle is received by a receiving vehicle, and the course change of the other transmitting vehicle is judged and processing is performed by the receiving vehicle with reference to this flow chart. When the turn signal on the transmitting vehicle is turned ON, for example, vehicle information acquisition module 100 in the transmitting vehicle acquires the blinker information, steering angle information, vehicle speed information, and other traveling environment information once per second, and transmits the information via transceiver 20 to the receiving side vehicle. The receiving vehicle stands by to receive the traveling environment information transmitted from the other vehicle by means of transceiver 20 when the information is transmitted.

In the following explanation, the transmitting vehicle (sometimes referred to herein as the "other" vehicle) is taken to be the lead vehicle, while the receiving vehicle acting (sometimes referred to herein as the "home" vehicle) is taken to be the following vehicle. However, the opposite roles can be adopted as well, namely, the transmitting vehicle can be the following vehicle while the receiving vehicle can be the lead vehicle. In this case, too, it is possible to output the result of a judgment of course change by the other vehicle based on the traveling environment information of the other vehicle.

In step S110, when the information of operation of the turn signal in the other vehicle is received by transceiver 20 in the receiving vehicle, control module 10 of the receiving vehicle enters the standby state for judgment of a course change by the other vehicle. With regard to the specific standby state processing, storage of the traveling environment information of the other vehicle in the memory 40 is started in step S120. In addition, by increasing the frequency of communication with the other vehicles by transceiver 20 to approximately once per second, it is possible to obtain the information frequently in case of course change by the other vehicles, so that judgment of course changes can be made quickly and correctly.

In addition, in step S130, control module 10 of the receiving vehicle outputs the information of the turn signal received from the other vehicle to user interface 30. As a specific example of the output operation, the following scheme may be adopted: the icon indicating the other vehicle is displayed on user interface 30. If the right-turn turn signal is operating, the turn signal icon blinks on the upper-right side of the icon indicating the other vehicle. If the left-turn turn signal works, the turn signal icon blinks on the upper-left side of the icon indicating the other vehicle. As a result, the user in the receiving vehicle can determine which turn signal of the other vehicle is in operation.

Then, in step S140, if the information indicating end of operation of the turn signal in the other vehicle is received by transceiver 20 in the receiving vehicle, road change judgment module 50 of the receiving vehicle judges the course change of the other vehicle in step S150. Judgment of the course change is made as judgment on left/right turn or change of lane.

Based on the blinker information and vehicle speed information stored in memory 40 for information about other vehicle, the operating time of the turn signal and the maximum value of the change in vehicle speed of the other vehicle during operation of the turn signal are computed. Then, for example, if the maximum value of the change in vehicle speed during operation of the turn signal of the other vehicle exceeds a prescribed level, for example, 20 km/h, the first condition, and the operating time of the right-turn turn signal exceeds a prescribed time, for example, 5 sec, the second condition, a right turn is judged to have occurred. On the other hand, if the maximum value of the change in vehicle speed during operation of the turn signal is lower than 20 km/h, and the operating time is shorter than 5 sec, as a change to the right lane is judged to have occurred.

When either the first condition or second condition is not met, it is judged that neither a right turn nor a change of lane has occurred.

Next, in step S160, control module 10 of the receiving vehicle outputs the course change judgment result to user interface 30. The following is an example of the output. For example, an icon indicating the receiving vehicle is shown near the icon indicating the other vehicle serving as the preceding vehicle, and an icon indicating a right/left turn or change of lane is shown near the icon indicating the vehicle itself. As a result, the user of the receiving vehicle can find out how the receiving vehicle should turn or change lanes in order to follow the transmitting vehicle.

FIGS. 3-6 are diagrams illustrating display examples to user interface 30. FIGS. 3A, 4A, 5A and 6A show the display output in step S130. FIGS. 3B, 4B, 5B and 6B show the output in step 160. In each of FIGS. 3-6, C2 is the receiving vehicle (acting as the home or following vehicle) and C1 is the transmitting vehicle acting as the other or lead vehicle). In FIGS. 3A, 4A, 5A and 6A, the operation of the turn signal of the other vehicle is indicated by the icons placed on the upper-right or upper-left side of icon C1 indicating the other vehicle. In FIGS. 3B, 4B, 5B and 6B, the result of judgment of a course change by the other vehicle is shown by the icon placed near icon C2 indicating the home vehicle. FIG. 3B shows a right turn; FIG. 4B shows a change to the right lane; FIG. 5B shows a left turn; and FIG. 6B shows a change to the left lane. However, the display status of user interface 30 is not limited to these examples. For example, one may omit icons C1 and C2 indicating the home vehicle and the other vehicle, and display only the operation of the turn signal and the course change judgment result.

In the explanation, it is assumed that when information of the operation of the turn signal of the other vehicle is received in step S110, the standby state for judgment of a course change by the other vehicle is entered into. However, it may also enter the standby state in other cases. For example, it may enter the standby state when the acceleration/deceleration of the other vehicle is greater than a prescribed value in a prescribed time, such as larger than 20 km/h for a prescribed time, or when the speed of the other vehicle is below a prescribed level, such as below 20 km/h.

A scheme can also be adopted in which, although the standby state is entered into when a judgment of a course change by the other vehicle is made, the standby state is released if the maximum value of the change in steering angle is less than a prescribed value or the maximum value of the change in angular velocity of the steering angle is less than a prescribed level after travel for a prescribed period of time for example, 1 min or travel for a certain distance for example, 100 m.

A number of features and benefits may be realized with the first embodiment:

1. The other vehicle on the transmission side is only required to transmit the traveling environment information. If desired, the transmitting vehicle need not computer a recommended route. Consequently, the construction of the transmitting vehicle may be simplified. For the receiving vehicle, it is only necessary to judge the course change of the other vehicle, and there is no need to display it on a map. Consequently, the construction of the receiving vehicle may be simplified.

Since both the other vehicle and the home vehicle may have a simpler constitution, it is possible for the both vehicles to be equipped to send and receive traveling environment information. Consequently, when the home can easily follow the other vehicle. If the home vehicle takes the lead, it can determine whether the other vehicle can follow it.

2. In the first embodiment, the other vehicle makes a left/right turn or lane changes. Consequently, if the receiving vehicle is the following vehicle, it can easily follow the transmitting vehicle. If the receiving vehicle is the leading vehicle, it can get sufficient information to judge whether the transmitting vehicle can follow it.

3. Because the standby state can be entered in certain situations, data transceiving and computer processing in the other situations can be minimized, so that it is possible to reduce the communication costs and to reduce the processing load on the computer.

4. When the standby state is released in certain situations, it is possible to minimize the workload of subsequent data transceiving and computer processing, so that it is possible to reduce the communication costs and the processing load on the computer.

5. The frequency of communication is increased in the standby state, so that it is possible to make quick and correct judgments of the course changes by the other vehicles.

6. Because course changes by other vehicles can be judged from the operating time of the turn signal and the changes over time in the speed of the other vehicles, it is possible to make correct judgments.

7. Because the judgment results are displayed using icons, output can be performed with a simple display device. In particular, when the home vehicle is a following vehicle, it is possible to reliably output the traveling environment information for the lead vehicle and the course to be taken by the home vehicle. On the other hand, if the home vehicle is the lead vehicle, since the same system is carried by the following vehicles, it is possible to judge whether the information for the home vehicle is being correctly transmitted to the following vehicles.

Modified Example of First Embodiment

Figure 7:
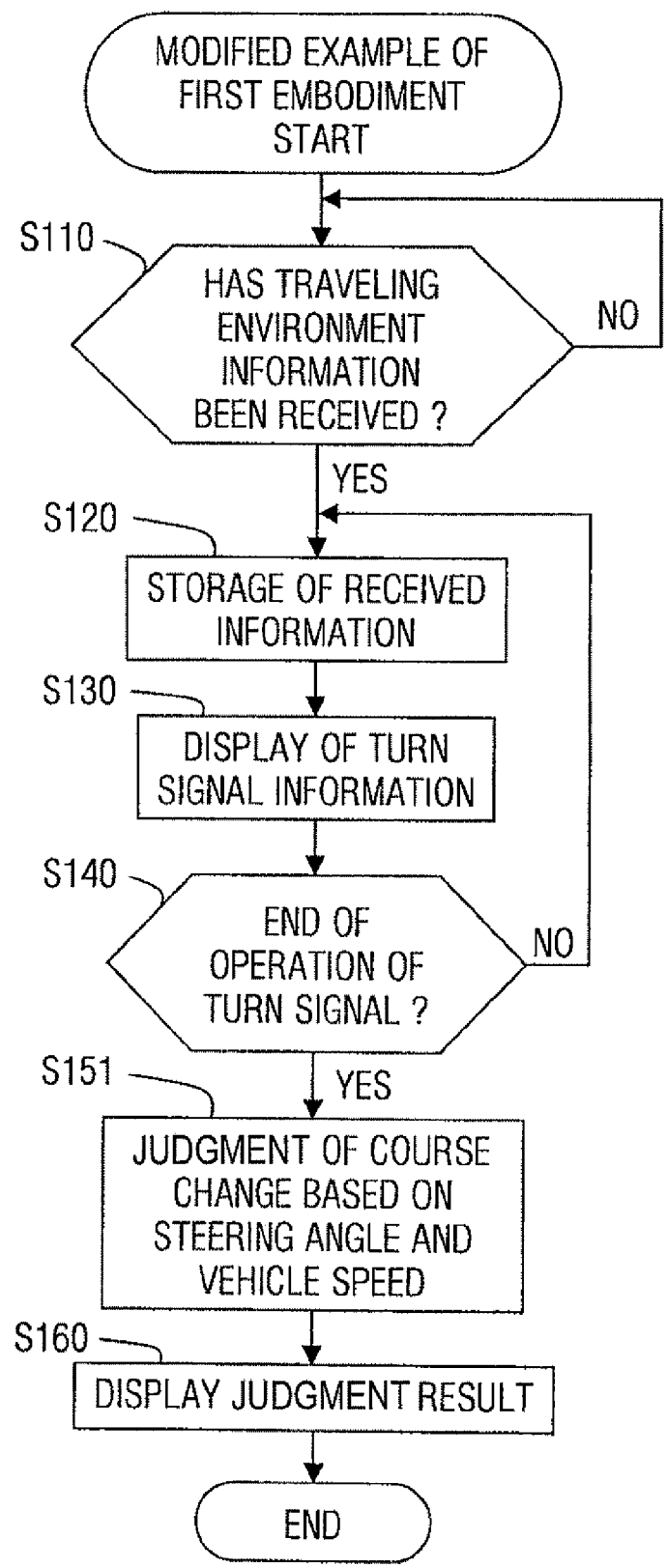
FIG. 7 is a flow chart illustrating an alternative operation of the first embodiment.

FIG. 7 is a flow chart illustrating the processing sequence of the guide system in a modified example of the first embodiment. The same modules represented by the same module numbers as those in FIG. 2 will not be explained again, and only features differing from the processing shown in FIG. 2 will be explained. In FIG. 2, course change judgment is made based on the vehicle speed information and blinker information for the other vehicle, while in the present modified example, course change judgment is made based on the vehicle speed information and steering angle information for the other vehicle.

In steps S110 and S120, when the information about turn signal operation in another vehicle is received, the standby state is entered for judging course change of the other vehicle. In step S130, the turn signal information for the other vehicle is output to user interface 30, and in step S140, the operation is the same as that in FIG. 2 with respect to storage of information in the memory 40 for information about the other vehicle until reception of the information indicating the end of operation of the turn signal in the other vehicle.

In next step S151, road change judgment module 50 of the receiving vehicle judges the course change for the other vehicle. The maximum value of the change in steering angle of the other vehicle and the maximum value of the change in vehicle speed is computed based on the blinker information, steering angle information and vehicle speed information of the other vehicles stored in the memory 40 for information about other vehicles. Then, a right turn is judged to have occurred when the following two conditions are met: first, the maximum value of the change in steering angle during the period of operation of the right turn turn signal of the other vehicle is larger than a prescribed amount, such as 30°; and second, the maximum value of the change in vehicle speed during the period of operation of the right turn turn signal exceeds a prescribed level, for example, 20 km/h. On the other hand, a change to the right lane is judged to have occurred if the maximum value of the change in steering angle during the period of operation of the right turn turn signal is smaller than 30°, and the maximum value of the change in vehicle speed is smaller than 20 km/h. When either of the first and second conditions is not met, it is judged that neither a right/left turn nor a change of lane has occurred.

Then, in step S160, the result of the course change judgment is output to user interface 30, and this is the same as that in FIG. 2.

In this modified example, correct judgments are made possible by judgment of the course changes of other vehicles based on the change over time in the steering angle and in the vehicle speed of the other vehicles.

In particular, when the other vehicle is the preceding vehicle, even when the other vehicle serving as a lead vehicle turns left/right and becomes hidden behind a building at an intersection, or when the lead vehicle becomes blocked by a larger vehicle due to a lane change, and subsequent communication is interrupted, it is still possible to estimate the course change of the preceding vehicle from the change over time in the steering angle and in the vehicle speed before interruption of the communication.

Second Embodiment

Figure 8:
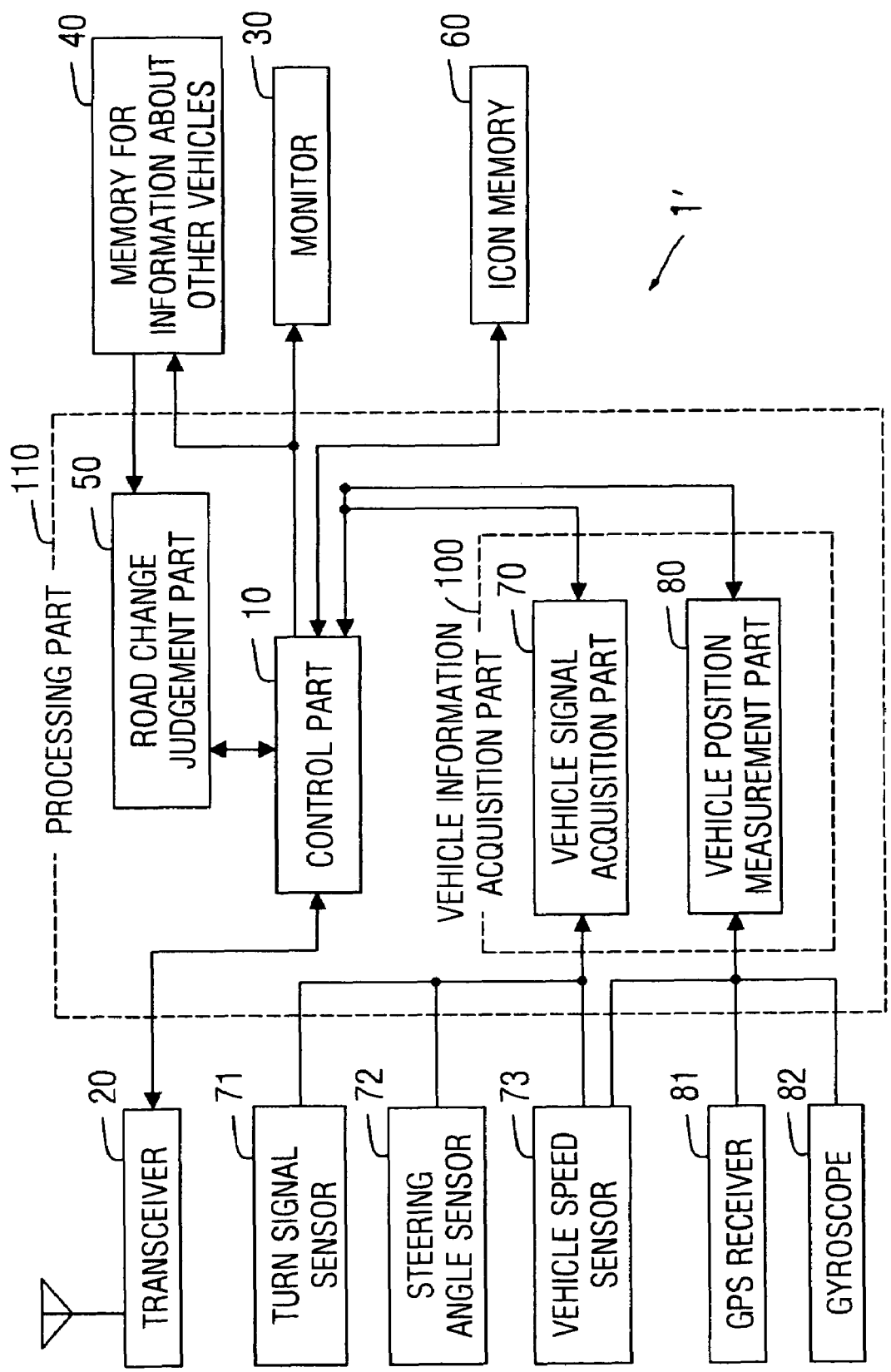
FIG. 8 is a block diagram of a guide system in accordance with a second embodiment of the invention.

FIG. 8 is a block diagram illustrating a guide system terminal device 1' in accordance with a second embodiment of the present invention. The same module numbers as those for the first embodiment in FIG. 1 are adopted here, and they will not be explained again.

In addition to the various constitutional features of the first embodiment, the guide system terminal device 1' in the second embodiment shown in FIG. 8 has the following feature: a GPS receiver 81 and a gyroscope 82 connected to processing module 110. A vehicle position measuring module 80 is provided in vehicle information acquisition module 100 within processing module 110. To save cost, the vehicle receiving the traveling environment information may operate without these additional elements. However, if both vehicles are equipped with guide system terminal devices having all of the components shown in FIG. 8, then both vehicles will be able to send and receive traveling environment information and thereby judge changes in the course of the other in accordance with the second embodiment of the invention.

By measuring each vehicle's own position, it is possible to compute the relative position between the vehicles, to be explained later, and since both vehicles have the same constitution, traveling environment information can be exchanged between them so that it is possible for both of them to judge the course change of the other vehicle.

GPS receiver 81 receives the synchronized electromagnetic signals from plural GPS satellites, and the time difference data for reception of the electromagnetic signals from each GPS satellite are sent to vehicle position measuring module 80.

Gyroscope 82 detects the orientation of the vehicle movement direction. The detected orientation of the vehicle is sent to vehicle position measuring module 80. Also, the vehicle speed information acquired by vehicle speed sensor 73 is also sent to vehicle position measuring module 80.

For vehicle position measuring module 80, when GPS receiver 81 successfully receives the electromagnetic signals from the GPS satellites, the current position of the vehicle is determined based on the time difference data for reception of the electromagnetic signals. On the other hand, if reception of the electromagnetic signals from the GPS satellites fails, the current position of the vehicle is computed based on the detection results of gyroscope 82 and vehicle speed sensor 73. The acquired current position information is sent as the traveling environment information to control module 10.

Operation of the Second Embodiment

Figure 9:
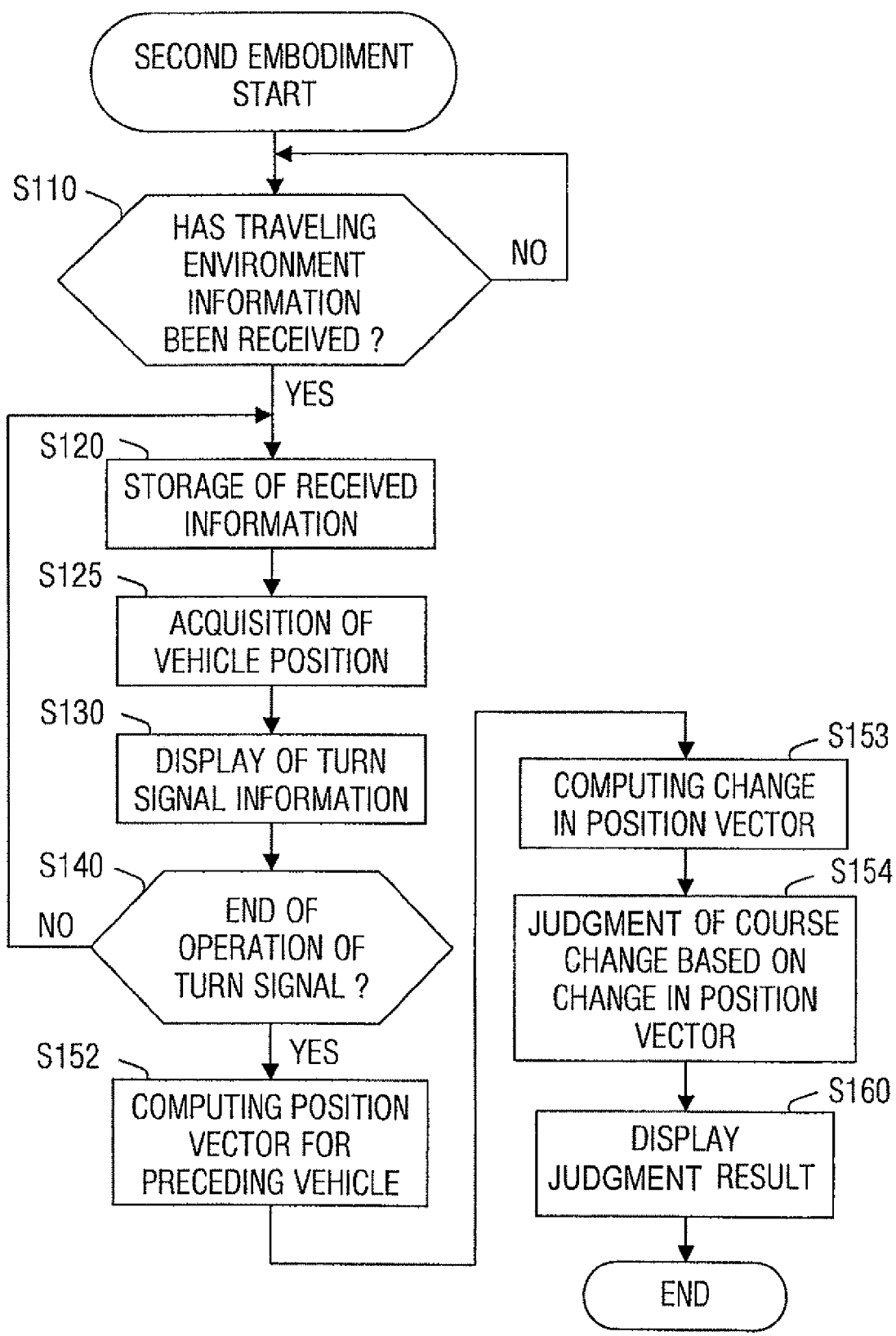
FIG. 9 is a flow chart illustrating the operation of the second embodiment.

FIG. 9 is a flow chart illustrating the processing sequence of the group operation support device in a modified example of the second embodiment. The same module numbers as those for the first embodiment in FIG. 2 are adopted, and they will not be explained again. In the flow chart shown in FIG. 9, as for that in FIG. 2, processing will be explained for the receiving vehicle that receives the traveling environment information acquired from the other vehicle, and that judges the course change of the other vehicle. When the turn signal in the transmitting vehicle serving as the other vehicle is turned ON, vehicle information acquisition module 100 of the transmitting vehicle acquires the traveling environment information, including the blinker information, steering angle information, vehicle speed information, and other vehicle signals and position information provided by vehicle position measuring module 80 at a frequency of, for example, once a second, and it transmits the information via transceiver 20 to the receiving vehicle.

In the following, an explanation will be given primarily for the situation in which the transmitting vehicle is the lead vehicle, while the receiving vehicle, that is, the home vehicle, is the following vehicle. However, even for the opposite scenario, that is, when the transmitting vehicle is the following vehicle while the receiving vehicle serving as the home vehicle is the lead vehicle, it is also possible to output the result of the judgment of a course change by the other vehicle based on the traveling environment information for the other vehicle.

In step S110, when the information on operation of the turn signal in the other vehicle is received by transceiver 20 of the receiving vehicle, control module 10 of the receiving vehicle enters the standby state for judging a course change by the other vehicle. More specifically, the standby state processing starts with storage of the traveling environment information for the other vehicle in the memory 40 for information about other vehicles in step S120. In addition, since the frequency of communication by transceiver 20 with the other vehicles is increased, the course change information for the other vehicles is acquired more frequently, so that course change judgments can be made quickly and correctly. In addition, when the receiving vehicle has vehicle position measuring module 80, GPS receiver 81, etc., as shown in step S125, the receiving vehicle may also initiate acquisition of information on the vehicle itself.

In addition, in step S130, as was explained with reference to FIGS. 2, 3 and 6, control module 10 of the receiving vehicle outputs the turn signal information received from the other vehicle to user interface 30.

Then, in step S140, when information about the end of operation of the turn signal in the other vehicle is received by transceiver 20 on the receiving vehicle, road change judgment module 50 of the receiving vehicle judges the course change by the other vehicle in steps S152-S154. The course change judgment is a judgment of whether the vehicle makes a left/right turn or changes lanes.

More specifically, when the transmitting vehicle serving as the other vehicle is the lead vehicle while the receiving vehicle is the following vehicle, first of all, in step S152, based on the position of the lead vehicle and the position of the following vehicle when the turn signal of the lead vehicle starts operating, the position vector of the lead vehicle from the standpoint of the following vehicle is computed. Similarly, based on the position of the lead vehicle and the position of the following vehicle at the end of operation of the turn signal of the lead vehicle, the position vector of the lead vehicle from the standpoint of the following vehicle is computed.

Then, based on the position vectors, in step S153, the change in the position vector from the start to end of operation of the turn signal of the lead vehicle, in particular the change in direction of the position vector, is computed. Then, in step S154, if the change in the position vector is larger than a prescribed value, such as 30°, it is judged that the lead vehicle has turned right. If not, it is judged that the lead vehicle has changed lanes. Then, in step S160, as was explained with reference to FIG. 2, control module 10 of the receiving vehicle outputs the result of the course change judgment to user interface 30.

As explained above, for example, when the information of operation of the turn signal of the other vehicle is received in step S110, the standby state is entered for judgment of a course change by the other vehicle. However, the standby state can also be entered in other situations. For example, the standby state can also be entered when the acceleration/deceleration of the other vehicle during a prescribed time is higher than a prescribed level, such as when the acceleration/deceleration is greater than 20 km/h in a prescribed time, or when the speed of the other vehicle is below a prescribed level, such as below 20 km/h.

Also, even when the standby state is entered for judgment of a course change by other vehicles, the standby state can be released if the maximum value of the change in steering angle is smaller than a prescribed value or the maximum value of the change in angular velocity of the steering angle is smaller than a prescribed value within a prescribed time for example, within 1 min or before traveling over a prescribed distance say, 100 m.

The position of the lead vehicle is acquired in step S110. The position of the receiving vehicle is obtained in step S125. The segment that connects the position of the home vehicle and the position of the lead vehicle is defined as the position vector. However, when the receiving vehicle does not have a vehicle position measuring module 80, GPS receiver 81, etc., there is no need to acquire the position of the receiving vehicle. In this case, instead of the processing in the steps S152-S154, a course change judgment is made based on the information history on the position of the transmitting vehicle serving as the other vehicle. More specifically, the movement direction of the transmitting vehicle is computed based on the position information for the lead vehicle at plural sites received by the following vehicle immediately after the start of turn signal operation in the receiving vehicle. Similarly, the movement direction of the transmitting vehicle is computed based on the position information at plural sites immediately before the end of operation of the turn signal in the transmitting vehicle. The difference in movement direction is computed, and if it is larger than 30°, it is judged that that transmitting vehicle has made a left/right turn. If not, it is judged that the transmitting vehicle has changed lanes. This judgment also can be made when the transmitting vehicle serving as the other vehicle is the following vehicle, and the receiving vehicle is the lead vehicle.

What is displayed on user interface 30 is the information for the turn signal that operates in the other vehicle and the information about whether the other vehicle has made a left/right turn or lane change. However, it is also possible to output to user interface 30 or the like the position where the other vehicle changes course or the position where the turn signal operates.

In the display of the position, for example, relative position information indicating how many meters the other vehicle is ahead or behind the home vehicle is displayed, and there is no need to display a map.

Effects of the Second Embodiment

In the second embodiment explained above, as in the first embodiment, both the home vehicle and the other vehicles can have a simple constitution, and the home vehicle can determine course changes made by the other vehicle. Consequently, if the home vehicle is the following vehicle, it can easily follow the other vehicle serving as the lead vehicle. On the other hand, if the home vehicle is the lead vehicle, it can easily check whether the other cars serving as following vehicles can follow it.

In the second embodiment, the vehicle position information is utilized. There is no need to display the position of the vehicle on the map, however. Consequently, a simple constitution can be realized as in the first embodiment. In addition, it is possible to judge the course change by simply computing the position vector or change in movement direction. Consequently, as in the first embodiment, there is no need to use map data as reference, and there is no need for a huge map database.

Third Embodiment

Figure 10:
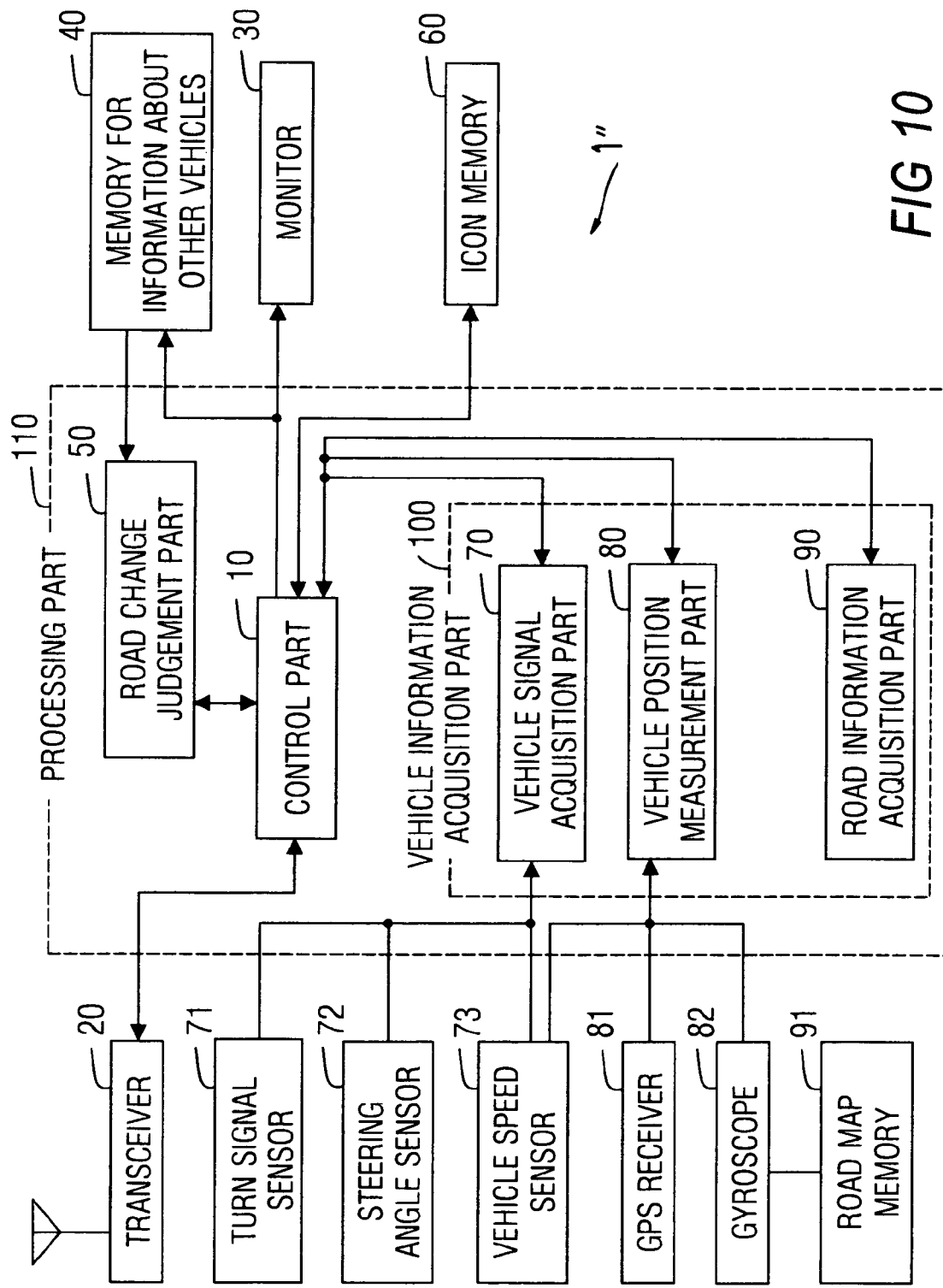
FIG. 10 is a block diagram of a guide system in accordance with a third embodiment of the invention.

FIG. 10 is a block diagram illustrating a guide system terminal device 1" in accordance with a third embodiment of the present invention. The same module numbers as those shown for the first embodiment in FIG. 1 are adopted here, and they will not be explained again.

In addition to the constitution of the first embodiment, the guide system terminal device 1" of the third embodiment shown in FIG. 10 has the following features: GPS receiver 81 and gyroscope 82 connected to processing module 110. A vehicle position measuring module 80 is provided in vehicle information acquisition module 100 within processing module 110. In addition, road map memory 91 is connected to processing module 110, and road information acquisition module 90 is provided in vehicle information acquisition module 100 within processing module 110.

To save cost, the vehicle transmitting the traveling environment information may operate without road map memory 91 and road information acquisition module 90. The vehicle that receives the traveling environment information may operate without GPS receiver 81, gyroscope 82 and vehicle position measuring module 80. However, if both vehicles are equipped with guide system terminal devices having all of the components shown in FIG. 10, it is possible for each to judge course changes by the other in accordance with the third embodiment.

GPS receiver 81 receives the synchronized electromagnetic signals from plural GPS satellites, and it sends the time difference data for reception of the electromagnetic signals from the GPS satellites to vehicle position measuring module 80.

Gyroscope 82 detects the orientation movement direction of the vehicle. The detected orientation of the vehicle is sent to vehicle position measuring module 80. Also, the vehicle speed information acquired by vehicle speed sensor 73 is also sent to vehicle position measuring module 80.

When GPS receiver 81 successfully receives the electromagnetic signals from the GPS satellites, vehicle position measuring module 80 measures the current position of the vehicle based on the time difference data for the received electromagnetic signals. When reception of the electromagnetic signals from the GPS satellites fails, the current position of the vehicle is computed based on the output of gyroscope 82 and vehicle speed sensor 73. The acquired current position information is sent as the traveling environment information to control module 10.

Road form information, intersection connection information, road type information, lane information, etc., are stored in road map memory 91. The road form information is represented by road links and nodes. It contains position coordinates for the nodes. The intersection connection information is information represented by road links and nodes. It contains the position coordinates of the nodes. The road type information includes information about whether each road is a highway or an automobile-only road and whether it is an interstate way, a municipal road, or a local road, as well as information pertaining to the presence/absence of an intersection at each position. Here, intersections include T-intersection, Y-intersection, and other 3-way intersections, +intersections and other 4-way intersections, 5-way intersections, etc. The lane information is information about the precise positions of the roads and the lanes of the roads.

The road information acquisition module 90 accesses the road type information of road map memory 91, acquires the road type information at the position of a given vehicle, and sends the traveling environment information to control module 10. In another scheme, it accesses the lane information of road map memory 91, acquires the lane information for a given vehicle position, and sends the traveling environment information about which road and which lane the vehicle is using to control module 10.

Operation of the Third Embodiment

Figure 11:
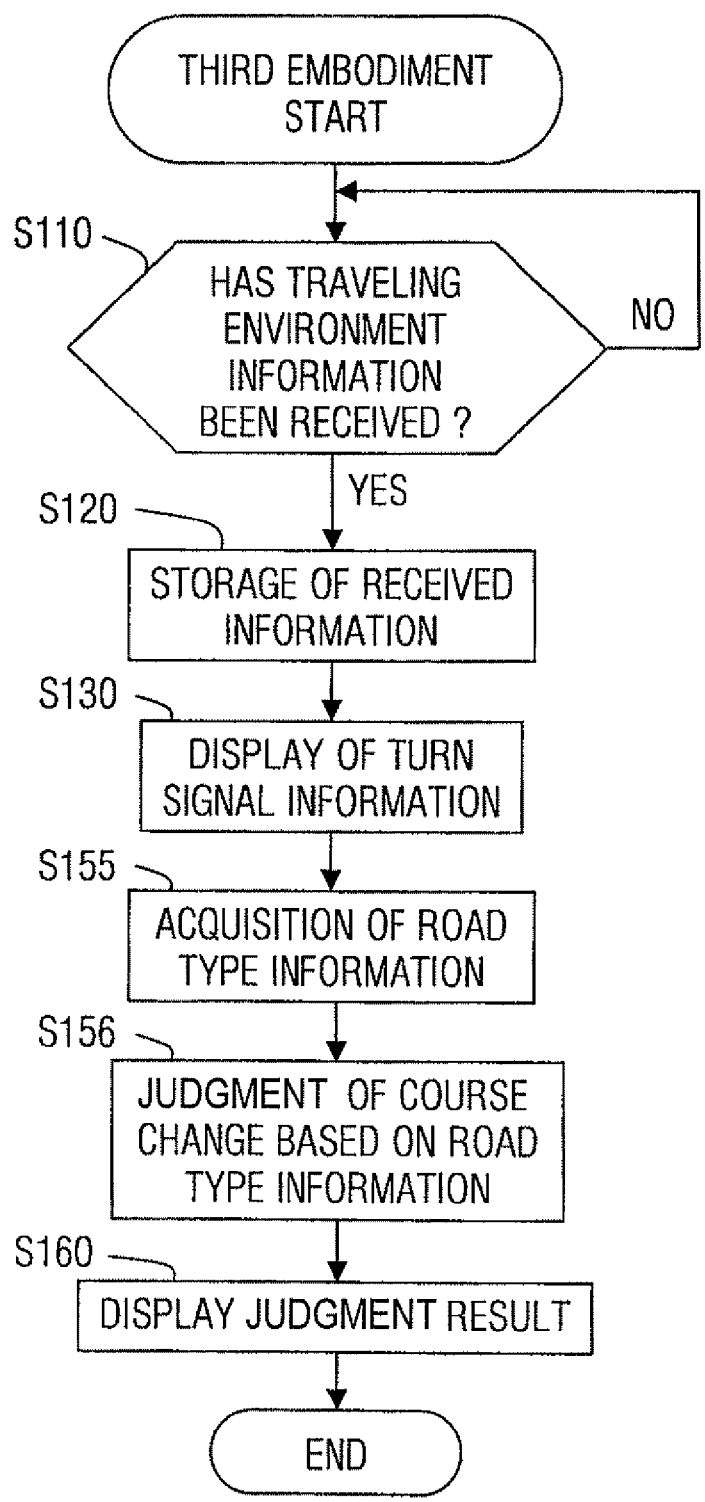
FIG. 11 is flow chart illustrating the operation of the third embodiment.

FIG. 11 is a flow chart illustrating the processing sequence of the group operation support device in a modified example of the third embodiment. The same module numbers as that of the first embodiment shown in FIG. 2 are used here, and they will not be explained in detail again. In the flow chart shown in FIG. 11, as for that in FIG. 2, the processing in the receiving vehicle will be explained wherein course change for the other vehicle will be judged serving as the traveling environment information acquired and transmitted by the other vehicle is received.

When the turn signal in the transmitting vehicle (serving as the other vehicle) operates, vehicle information acquisition module 100 in the transmitting vehicle acquires the blinker information, steering angle information, vehicle speed information, and other vehicle signals, and the position information determined by the vehicle position measuring module 80 and other traveling environment information once a second, and transmits the information via transceiver 20 to the receiving vehicle. When the transmitting vehicle is provided with road map memory 91 and road information acquisition module 90, it is also possible to transmit the road information obtained by road information acquisition module 90 to the receiving vehicle in place of, or together with, the position information determined by vehicle position measuring module 80.

In the following, an explanation will be given regarding the situation when the transmitting vehicle is the lead vehicle, and the receiving vehicle is the following vehicle. However, even in the opposite situation, that is, the transmitting vehicle is the following vehicle while the receiving vehicle is the lead vehicle, it is also possible to output the result of the course change judgment for the other vehicle based on the traveling environment information of the lead vehicle.

First of all, in step S110, when the information about turn signal operation in the other vehicle is received by transceiver 20 of the receiving vehicle, control module 10 of the receiving vehicle enters the standby state for judging a course change by the other vehicle. More specifically, the standby state processing starts with storage of the traveling environment information for the other vehicle in memory 40 for information about other vehicles in step S120. In addition, since communication with the other vehicles by transceiver 20 occurs more frequently, information course changes by the other vehicles are acquired more often, so that course change judgments can be made quickly and correctly.

In addition, in step S130, as was explained with reference to FIGS. 2, 3 and 6, control module 10 of the receiving vehicle outputs the turn signal information received from the other vehicle to user interface 30.

Then, road change judgment module 50 of the receiving vehicle judges the course changes by the other vehicle in steps S155 and S156. Here, course change judgment means judgment of left/right turns or lane changes.

More specifically, first of all, in step S155 the road type information for the road on which the transmitting vehicle is running is obtained from the traveling environment information for the transmitting vehicle stored in memory 40 for information about other vehicles. In particular, when the road type information is not transmitted from the transmitting vehicle, road information acquisition module 90 of the transmitting vehicle accesses road map memory 91 based on the vehicle position of the transmitting vehicle, and obtains the road type information for the transmitting vehicle.

The following course change judgment is then made in step S156, from the type of road and the presence/absence of a nearby intersection. That is, when the road on which the transmitting vehicle is running is a highway or an automobile-only road, there is no intersection as long as there is no parking area, service area, junction, etc. When the turn signal in the transmitting vehicle operates, it is judged that change of lane is occurring. However, there is the possibility that the vehicle may park on the shoulder of the road due to breakdowns, etc. In this case, the hazard indicator or the left turn signal operates for a long time. Consequently, when the turn signal operates for 30 sec or longer, it is not judged to represent a lane change. Instead, it is judged to represent parking since this is more plausible. On the other hand, when the road on which the transmitting vehicle is running is other than the highway or automobile-only road, a judgment is made on the presence/absence of nearby intersection. Then, for example, if there is an intersection within 50 m ahead of the transmitting vehicle, if the turn signal operates, it is judged to represent a right/left turn. If there is no intersection, it is judged to represent a lane change.

Then, in step S160, as was explained with reference to FIG. 2, control module 10 of the receiving vehicle outputs the course change judgment result to user interface 30.

As explained above, for example, when the information about turn signal operation in the other vehicle is received in step S110, the standby state is entered into for judgment of a course change by the other vehicle. However, the standby state can also be entered in other situations. For example, the standby state can also be entered when the acceleration/deceleration of the other vehicle during a prescribed time is above a prescribed level, such as when the acceleration/deceleration is greater than 20 km/h in a prescribed time, or when the speed of the other vehicle is below a prescribed level, such as below 20 km/h.

Also, even when the standby state for judgment of a course change by other vehicles is entered into, the standby state can be released if the maximum value of change in the steering angle is smaller than a prescribed value or the maximum value of change in the angular velocity of the steering angle is smaller than a prescribed value within a prescribed time, say within 1 min, or before a prescribed distance, for example 100 m, is traversed.

Effects of the Third Embodiment

In the third embodiment explained above, as in the first embodiment, both the home vehicle and other vehicles can have a simple constitution, and the home vehicle can be aware of course changes by the other vehicle. Consequently, if the home vehicle is the following vehicle, it can easily follow the other vehicle serving as the lead vehicle. On the other hand, if the home vehicle is the lead vehicle, it can easily check whether the other cars serving as following vehicles can follow it.

Vehicle position information is utilized in the third embodiment. However, there is no need to display the vehicle position on a map. Consequently, a simple constitution can be realized as in the first embodiment.

In addition, the third embodiment allows judging course changes based on the road information for the road on which the other vehicle is running. Consequently, it is possible to make even more correct judgments.

Also, because the presence/absence of an intersection can be found from the road type information, it is possible to correctly judge course changes by the other vehicles.

Modified Example of the Third Embodiment

Figure 12:
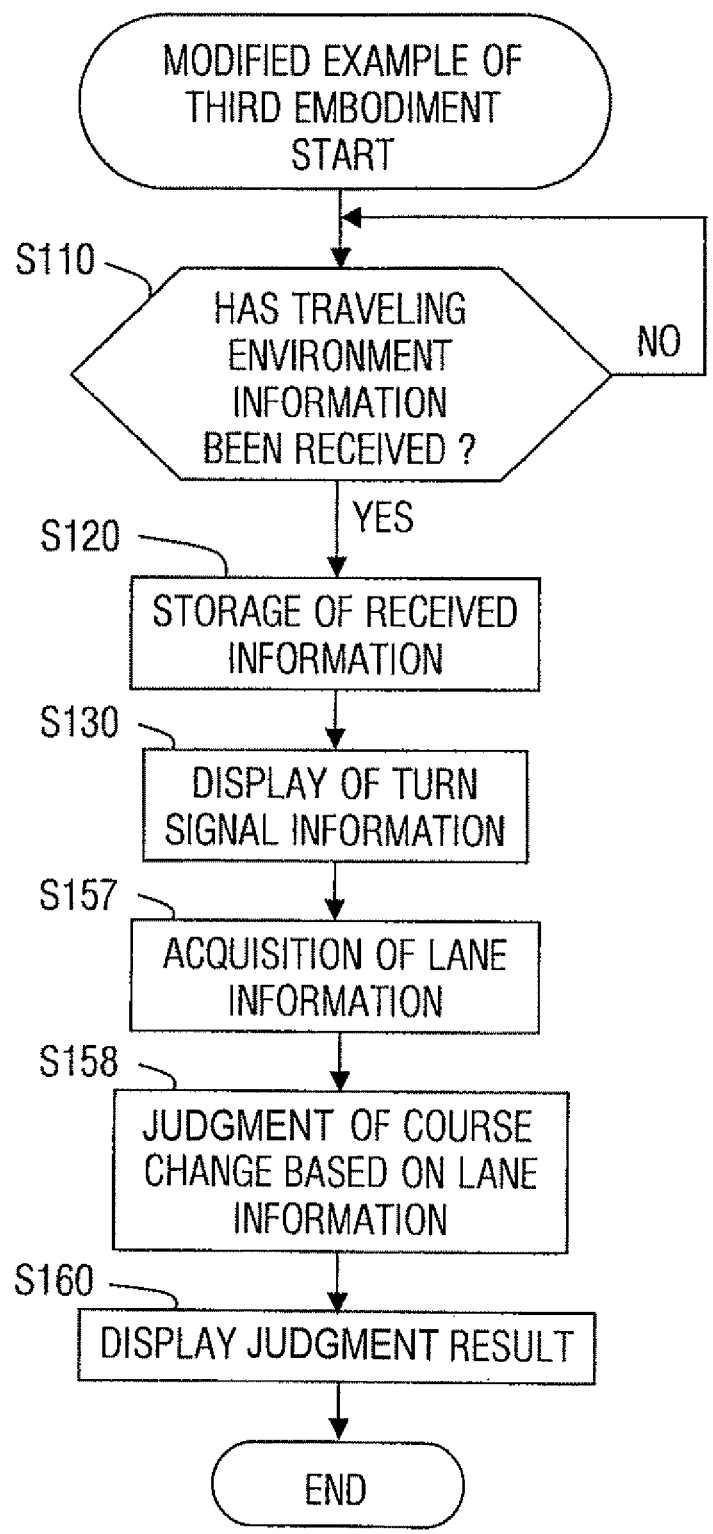
FIG. 12 is a flow chart illustrating the alternative operation of the second embodiment.

FIG. 12 is a flow chart illustrating the processing sequence of the group operation support device in a modified example of the third embodiment. The same modules represented by the same module numbers as those in FIG. 11 will not be explained again, and only features different from the processing shown in FIG. 11 will be explained. In FIG. 11, a course change judgment is made based on the road information for the other vehicle, in particular the road type information. In the present example, a judgment of a course change is made based on the lane information serving as the road information for the other vehicle.

In steps S110 and S120, when the information about turn signal operation in the other vehicle is received, the standby state for judging a course change by other vehicles is entered into and the information is stored in information memory 40. In step S130, the information about the turn signal in another vehicle is output to user interface 30. These features are same as those shown in FIG. 11.

Then, in steps S157 and S158 (shown in FIG. 12), road change judgment module 50 of the receiving vehicle judges the course change of the other vehicle. Course change judgment is judgment of left/right turns or lane changes.

More specifically, in step S157, from the traveling environment information of the transmitting vehicle stored in memory 40 for information, the information on the lane where the transmitting vehicle is running is acquired. In particular, when the lane information is not sent from the transmitting vehicle, road information acquisition module 90 of the receiving vehicle accesses road map memory 91 based on the vehicle position of the transmitting vehicle, and acquires the lane information for the transmitting vehicle.

Then, in step S158, a judgment is made concerning a course change based on the information about which lane the transmitting vehicle is using. That is, when the transmitting vehicle shifts to another lane on the same road, it is judged that a lane change has occurred. When the vehicle moves from one road to another road, it is judged that a left/right turn has occurred. When there is no road or lane change within a prescribed time after the start of turn signal operation, the vehicle is judged to be running straight ahead.

Then, in step S160, the course change judgment result is output to user interface 30, and this feature is the same as that in FIG. 11.

Effects of the Modified Example of the Third Embodiment

In this modified example, course change judgment for other vehicles based on the lane information for the other vehicle permits making correct course change judgments.

In the embodiments, transceiver 20 corresponds to the "transceiving means" of the present invention; road change judgment module 50 corresponds to the "course change judgment means"; user interface 30 corresponds to the "judgment result output means"; and vehicle position measuring module 80 corresponds to the "position information acquisition means.

The first-third embodiments can be adopted alone or in any combination. For example, by combining the first embodiment and the second embodiment, it is possible to add the position information judgment result to the result of judgment of the turn signal, vehicle speed, and other vehicle signals to facilitate judging a course change. Also, by combining the first embodiment and/or the second embodiment with the third embodiment, it is also possible to judge the course change taking the road information judgment result into consideration.

Also, while the disclosed embodiments were illustrated with just two vehicles, the invention may be practiced with larger groups of vehicles.

This application is based on Japanese Patent Application No. 2004-379769, filed Dec. 28, 2004 in the Japanese Patent Office, the entire contents of which are hereby incorporated by reference.

Also, the above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A guidance system for use in a group of vehicles including at least a first vehicle and a second vehicle, comprising:
a first controller associated with the first vehicle and adapted to generate travel environment information of the first vehicle, wherein the travel environment information comprises a speed of the first vehicle and at least one of information concerning operation of a turn signal of the first vehicle and information concerning a steering angle of the first vehicle;
a user interface associated with the second vehicle; and
a second controller in radio communication with the first controller, the second controller programmed to determine course change information of the first vehicle based on the travel environment information and to display the course change information on the user interface.

2. The guidance system of claim 1, wherein the second controller determines course change information that indicates whether the first vehicle has made a right/left turn or lane change based on the travel environment information.

3. The guidance system of claim 1, further comprising:
a timer adapted to determine a duration of operation of the turn signal; and
a vehicle speed change module adapted to determine a change in the speed; wherein
the second controller is responsive to the timer and the vehicle speed change module to determine the course change information based on the duration of operation of the turn signal and the change in the speed.

4. The guidance system of claim 3, wherein the second controller is further adapted to:
determine that the first vehicle has made a left/right turn if the duration of operation of the turn signal is longer than a prescribed time and the change in the speed is above a prescribed value; and determine that the first vehicle has changed lanes if the duration of operation of the turn signal is equal to or shorter than the prescribed time and the change in the speed is equal to or below the prescribed value.

5. The guidance system of claim 1, further comprising:
a steering angle change computing module that computes a change in the steering angle; and
a vehicle speed change module adapted to determine a change in the speed; wherein
the second controller is responsive to the steering angle change computing module and the vehicle speed change module to determine course change information based on the change in the steering angle and the change in the speed.

6. The guidance system of claim 1, wherein the second controller is further adapted to:
determine that the first vehicle has made a left/right turn if a change in the steering angle is larger than a prescribed value and a change in the speed is larger than a prescribed value; and determine that the first vehicle has changed lanes if the change in the steering angle is equal to or smaller than the prescribed value and the change in the speed is equal to or below the prescribed value.

7. A guidance system for use in a group of vehicles including at least a first vehicle and a second vehicle, comprising:
a first controller associated with the first vehicle and adapted to generate travel environment information of the first vehicle, wherein the travel environment information comprises position information;
a user interface associated with the second vehicle; and
a second controller in radio communication with the first controller, the second controller programmed to determine course change information of the first vehicle based on the travel environment information and to display the course change information on the user interface, to compute a position vector for the first vehicle relative to the second vehicle based on the position information, and to determine the course change information based on changes in the position vector.

8. The guidance system of claim 1, wherein the travel environment information further comprises position information and road information; and the second controller is further adapted to determine the course change information based on the position information and the road information for a road corresponding to the position information.

9. The guidance system of claim 8, wherein the road information includes information about at least one of road type and lane information.

10. The guidance system of claim 8, wherein the second controller is further adapted to output the position information when the course change information indicates that the first vehicle has changed course.

11. The guidance system of claim 1, wherein the second controller is further adapted to determine the course change information based on the travel environment information received before interruption of communication with the first controller when communication between the first and second controllers is interrupted.

12. The guidance system of claim 1, wherein the second controller is further adapted to activate a standby mode if at least one of the following conditions is true: the operation of the turn signal starts; a change in the speed is above a first prescribed level; and the speed is below a second prescribed level.

13. The guidance system of claim 12, wherein the second controller is further adapted to deactivate the standby mode if at least one of the following conditions is true: an amount of steering angle change for the first vehicle is smaller than a third prescribed value; an angular velocity value for the steering angle of the first vehicle is smaller than a fourth prescribed value during a prescribed time; and the first vehicle has traveled a prescribed distance.

14. The guidance system of claim 12, wherein the first and second controllers are adapted to communicate more frequently when the standby mode is activated than they communicate when the standby mode is not activated.

15. The guidance system of claim 1, wherein the second controller is further adapted to display on the user interface an icon representing the first vehicle and an icon representing the second vehicle; to display the travel environment information for the first vehicle near the icon representing the first vehicle; and to display the course change information near the icon representing the second vehicle.

16. A guidance terminal for transmitting guidance information from a vehicle, comprising:

a controller associated with the vehicle and adapted to generate travel environment information of the vehicle, the travel environment information including information concerning operation of a turn signal of the vehicle; and a radio transmitter responsive to the controller to wirelessly transmit the travel environment information.

17. A guidance terminal for use in a first vehicle for receiving guidance information transmitted by a second vehicle, comprising:

a user interface associated with the first vehicle;

a receiver adapted to receive a radio transmission from the first vehicle, which transmission includes travel environment information of the first vehicle, the travel environment information including a speed of the first vehicle and at least one of information concerning operation of a turn signal of the first vehicle and information concerning a steering angle of the first vehicle; and a controller operatively coupled to the receiver and programmed to determine course change information of the first vehicle based on the travel environment information received by the receiver and to display the course change information on the user interface.

18. A method for exchanging guidance information between a first and second vehicle, comprising:

generating travel environment information of the first vehicle, wherein the travel environment information comprises a speed of the first vehicle and at least one of information related to operation of a turn signal of the first vehicle and information related to a steering angle of the first vehicle;

wirelessly transmitting the travel environment information from the first vehicle to the second vehicle;

determining course change information for the first vehicle based on the travel environment information; and displaying the course change information on a user interface located in the second vehicle.

19. The method of claim 18, further comprising:

determining course change information for the first vehicle which includes a determination of whether the first vehicle has turned left, turned right and changed lanes.

20. The method of claim 18, further comprising:

computing a duration of operation of the turn signal;

computing a change in the speed; and determining the course change information based on the duration of the operation of the turn signal and on the change in the speed.

21. The method of claim 18, further comprising:

computing changes in the steering angle of the first vehicle;

computing changes in the speed of the first vehicle;

determining course change information based on the computed changes in the steering angle and the speed.

* * * * *